(12) United States Patent
Wu et al.

(10) Patent No.: US 8,506,827 B2
(45) Date of Patent: *Aug. 13, 2013

(54) SHORT PITCH METAL GRATINGS AND METHODS FOR MAKING THE SAME

(75) Inventors: Qihong Wu, Somerset, NJ (US); Sheng Liu, Harrison, NJ (US); Xu Zhang, Montville, NJ (US); Shiaw-wen Tai, Livingston, NJ (US); Xiaohua Du, Highland Park, NJ (US); Thomas Tombler, Somerset, NJ (US)

(73) Assignee: Polarization Solutions, LLC, Somerset, NJ (US)

( * ) Notice: Subject to any disclaimer, the term of this patent is extended or adjusted under 35 U.S.C. 154(b) by 619 days.

This patent is subject to a terminal disclaimer.

(21) Appl. No.: 12/563,824

(22) Filed: Sep. 21, 2009

(65) Prior Publication Data

US 2010/0072170 A1 Mar. 25, 2010

Related U.S. Application Data

(60) Provisional application No. 61/099,072, filed on Sep. 22, 2008.

(51) Int. Cl.
*C23F 1/02* (2006.01)
(52) U.S. Cl.
USPC .................. 216/13; 216/2; 216/24; 438/497
(58) Field of Classification Search
USPC ................................ 216/13, 2, 24; 438/497
See application file for complete search history.

(56) References Cited

U.S. PATENT DOCUMENTS

2005/0277063 A1 12/2005 Wang et al.
2009/0041971 A1* 2/2009 Wang et al. ............. 428/54
2009/0053655 A1 2/2009 Deng et al.

FOREIGN PATENT DOCUMENTS

KR 2003-0003330 1/2003

OTHER PUBLICATIONS

Levy, R.A., et al., "Characterization of LPCVD Aluminum for VLSI Processing," J. Electrochem. Soc.: Solid-State Science and Technology, pp. 2175-2182 (1984).
Yong Ju Lee, et al., "Study on Characteristics of Aluminum Thin Films Prepared by Atomic Layer Deposition," Journal of Vacuum Science & Technology, A: Vacuum, Surfaces, and Films 20(6):1983-1988 (2002).
Yong Ju Lee, et al., "Atomic Layer Deposition of Aluminum Thin Films Using an Alternating Supply of Trimethylaluminum and a Hydrogen Plasma," Electrochemical and Solid-State Letters 5(10):C91-C93 (2002).

* cited by examiner

*Primary Examiner* — Nadine Norton
*Assistant Examiner* — Mahmoud Dahimene
(74) *Attorney, Agent, or Firm* — Onello & Mello, LLP

(57) ABSTRACT

Methods for forming a metal grating include providing a first grating including a plurality of grating lines formed from a dielectric material, each grating having a pair of sidewalls, facing sidewalls of adjacent grating lines being separated by corresponding trenches, the grating lines and trenches forming a grating surface; forming a layer of a metal on the grating surface, where the metal layer has a constant thickness and conforms to the grating surface; and removing portions of the metal layer between sidewalls of adjacent grating lines of the first grating to form a metal grating having grating lines formed from the metal, the grating lines of the metal grating corresponding to the portions of the metal layer adjacent the sidewalls of the grating lines of the first grating. The metal grating has a pitch of 200 nm or less, a depth of 50 nm or more, and the grating lines of the metal grating have an aspect ratio of 10-to-1 or more.

20 Claims, 5 Drawing Sheets

SHORT PITCH METAL GRATINGS AND METHODS FOR MAKING THE SAME

CROSS-REFERENCE TO RELATED APPLICATIONS

This claims priority to Provisional Patent Application No. 61/099,072, entitled "SHORT PITCH METAL GRATINGS AND METHODS FOR MAKING THE SAME," filed on Sep. 22, 2008, the entire contents of which is incorporated herein by reference.

FIELD OF THE INVENTION

This disclosure relates to short pitch metal gratings and methods for making such gratings.

BACKGROUND

Optical devices and optical systems are commonly used where manipulation of light is desired. Examples of optical devices include lenses, polarizers, optical filters, antireflection devices, retarders (e.g., quarter-waveplates), and beam splitters (e.g., polarizing and non-polarizing beam splitters). Polarizers include wire-grid polarizers, which can be formed from metal gratings.

SUMMARY

In certain aspects, the disclosure relates to methods for forming short-pitch, high aspect ratio, metal gratings. The metal gratings can have a pitch of about 200 nm or less (e.g., in a range from 50 nm to 150 nm) and an aspect ratio of about 10-to-1 or more (e.g., 15-to-1 or more, 20-to-1 or more). The metal gratings can have a depth in a range from about 50 nm to about 500 nm. The metal grating lines can have extremely narrow line-widths. For example, the metal grating lines can have a line width as low as 5 nm. In some embodiments, the metal grating lines can have a line width in a range from 5 nm to 40 nm.

In general, the methods involve forming a thin layer of a metal on a surface of a non-metal grating (e.g., dielectric grating) that has a greater pitch than the desired pitch of the metal grating. The metal layer is formed using a technique that results in a conformal layer of uniform thickness over the grating. Here, uniform thickness means the thickness of the metal layer is substantially the same (e.g., varies by about 10% or less) between portions of the grating surface having differing orientations. For example, the thickness of the metal layer is substantially the same between the non-metal grating lines, on the non-metal grating line sidewalls, and on the tops of the non-metal grating lines. Suitable deposition methods for forming such a layer can include, for example, atomic layer deposition (e.g., plasma-enhanced atomic layer deposition) and low-pressure chemical vapor deposition.

Portions of the metal layer between adjacent side-walls of the non-metal grating lines are removed, yielding the metal grating. In other words, the metal grating lines correspond to the portions of the metal layer adjacent the side-walls of the non-metal grating lines. The portions of the metal layer can be removed, for example, by etching (e.g., reactive ion etching) using an appropriate etchant.

Additional processing steps can be involved. For example, the grating lines of the non-metal grating can be removed, yielding a free-standing metal grating. Alternatively, or additionally, additional materials can be deposited over the metal grating lines. For example, dielectric materials can be deposited over the metal grating lines.

Accordingly, the grating lines of the metal grating can be supported by grating lines of a dielectric grating having a longer pitch than the metal grating, or can be free-standing grating lines. In some embodiments, the metal grating lines can be embedded in one or more non-metal (e.g., dielectric) materials. For example, the layer containing the metal grating can be a monolithic layer, composed of alternating metal and non-metal (e.g., dielectric) lines of material.

The short-pitch, high aspect ratio gratings can be used as polarizers, e.g., for UV and/or visible light. In some embodiments, the gratings can be used as broadband polarizers (e.g., operating from about 300 nm to about 700 nm). The short-pitch, high aspect ratio nature of the metal grating lines can provide high transmission of pass polarization state light and high polarization efficiency. Furthermore, the gratings can be formed entirely from inorganic materials, providing excellent environmental stability.

In general, in one aspect, the invention features a method that includes depositing a first material over a surface of a first layer including a plurality of rows of a second material extending along a first direction and spaced apart from one another in a second direction orthogonal to the first direction, the first material forming a second layer that conforms to the surface of the first layer, and removing portions of the second layer to produce a plurality of rows of the first material extending along the first direction and spaced from one another in the second direction. The first material is deposited using plasma enhanced atomic layer deposition or low pressure chemical vapor deposition. The first material is a metal and the first and second materials are different.

Implementations of the method can include one or more of the following features.

For example, the rows of the second material can be arranged periodically in the second direction with a period $\Lambda$. The rows of the first material can be arranged periodically in the second direction with a period $\lambda$. $\lambda$ can be smaller than $\Lambda$. In some embodiments, $\lambda$ is about $\Lambda/2$. A width in the second direction of each row of the second material can be about $\Lambda/4$. A thickness of the first layer in a third direction orthogonal to the first and second directions can be about $\Lambda/4$. $\Lambda$ can be about 200 nm or less (e.g., about 150 nm or less).

The metal can be aluminum, tungsten, copper, or silver. The second material can be an inorganic material. The second material can be a dielectric material.

Removing portions of the second layer can include etching the second layer. The second layer can be etched anisotropically.

The rows of the first material can form a grating with a grating period of about 100 nm or less (e.g., about 75 nm or less). The rows of the first material can form a wire grid polarizer for light having a wavelength of about 400 nm or less.

The method can include forming one or more additional layers over the rows of the first material. For example, the method can include forming a layer (e.g., a conformal layer) of a dielectric material over the rows of the first material.

In general, in one aspect, the invention features methods that include providing a first grating including a plurality of grating lines formed from a dielectric material, each grating having a pair of sidewalls, facing sidewalls of adjacent grating lines being separated by corresponding trenches, the grating lines and trenches forming a grating surface; forming a layer of a metal on the grating surface, where the metal layer has a constant thickness and conforms to the grating surface; and removing portions of the metal layer between sidewalls of adjacent grating lines of the first grating to form a metal grating having grating lines formed from the metal, the grating lines of the metal grating corresponding to the portions of the metal layer adjacent the sidewalls of the grating lines of the first grating. The metal grating has a pitch of 200 nm or less, a depth of 50 nm or more, and the grating lines of the metal grating have an aspect ratio of 10-to-1 or more.

Implementations of the method can include one or more of the following features. For example, the metal layer can be formed using atomic layer deposition. Using atomic layer deposition can include sequentially forming a plurality of intermediate layers of the metal on the grating surface, each of the intermediate layers conforming to the grating lines. Forming each of the intermediate layers can include introducing a reagent into a chamber housing the first grating and forming a plasma from the reagent.

In some embodiments, the metal layer is formed using chemical vapor deposition. The chemical vapor deposition can be performed at a pressure less than 1 torr (e.g., about 0.1 torr or less, about 0.01 torr or less, about 0.001 torr or less, about 0.0001 torr or less, about 0.00001 torr or less, about 0.000001 torr or less).

Providing the first grating can include forming a layer of the dielectric material on a substrate and removing portions of the layer to form the first grating.

Providing the first grating can include removing portions of a substrate composed of the dielectric material to provide the first grating.

The dielectric material can be an inorganic dielectric material. The metal can be aluminum, tungsten, copper, gold, or silver.

The portions of the metal layer can be removed by etching of the metal layer (e.g., by reactive ion etching).

The metal grating can have a pitch of 100 nm or less (e.g., 80 nm or less, 60 nm or less, 50 nm or less). The grating lines of the metal grating can have an aspect ratio of 15-to-1 or more (e.g., 20-to-1 or more, 25-to-1 or more, 30-to-1 or more). The metal grating can have a depth in a range from 100 nm to 500 nm (e.g., from 150 nm to 450 nm, from 200 nm to 300 nm). The grating lines of the metal grating have a line width in a range from 5 nm to 40 nm (e.g., about 10 nm, about 12 nm, about 15 nm, about 20 nm, about 25 nm, about 30 nm). In some embodiments, the grating lines of the metal grating have a line width of 15 nm or less.

The methods can further include forming layers of one or more additional materials over the metal grating lines (e.g., forming one or more dielectric materials over the metal grating lines).

In general, in a further aspect, the invention features methods that include providing a first grating including a plurality of grating lines formed from a dielectric material, each grating having a pair of sidewalls, facing sidewalls of adjacent grating lines being separated by corresponding trenches, the grating lines and trenches forming a grating surface; forming a layer of a metal on the grating surface, where the metal layer has a constant thickness and conforms to the grating surface; and removing portions of the metal layer between sidewalls of adjacent grating lines to form a metal grating having grating lines formed from the metal, the grating lines of the metal grating corresponding to the portions of the metal layer adjacent the sidewalls of the grating lines of the first grating layer. The metal grating has a pitch of 200 nm or less, a depth of 50 nm or more, and the grating lines of the metal grating have a line width of 30 nm or less. Implementations of the methods can include one or more of the features discussed with respect to other aspects.

In general, in another aspect, the invention features methods that include providing a first grating including a plurality of grating lines formed from a dielectric material, each grating having a pair of sidewalls, facing sidewalls of adjacent grating lines being separated by corresponding trenches, the grating lines and trenches forming a grating surface; forming a layer of a metal on the grating surface using atomic layer deposition, where the metal layer has a constant thickness and conforms to the grating surface; and removing portions of the metal layer between sidewalls of adjacent grating lines to form a metal grating having grating lines formed from the metal, the grating lines of the metal grating corresponding to the portions of the metal layer adjacent the sidewalls of the grating lines of the first grating layer. The second grating has a pitch of 200 nm or less and a depth of 50 nm or more. Implementations of the methods can include one or more of the features discussed with respect to other aspects.

BRIEF DESCRIPTION OF THE FIGURES

Like reference symbols in the various drawings indicate like elements.

DETAILED DESCRIPTION

Figure 1A:
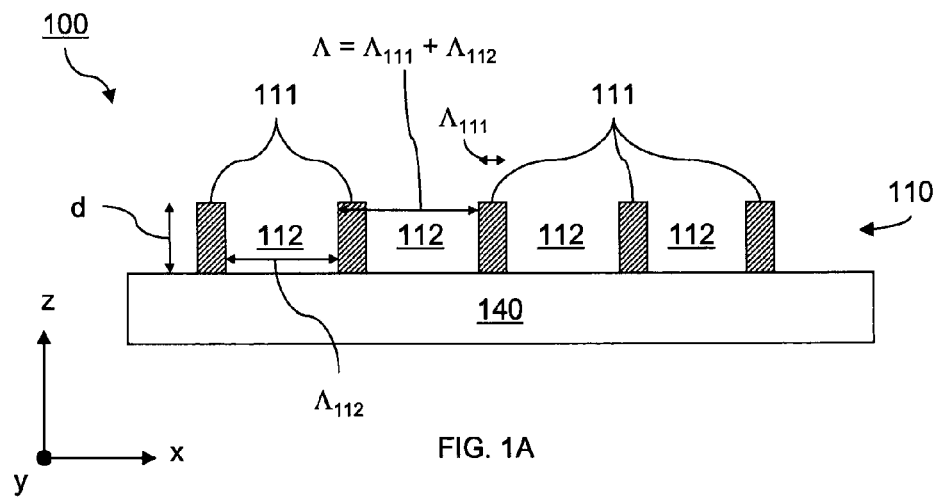
FIG. 1A is a cross-sectional view of an embodiment of a polarizer film.
Figure 1B:
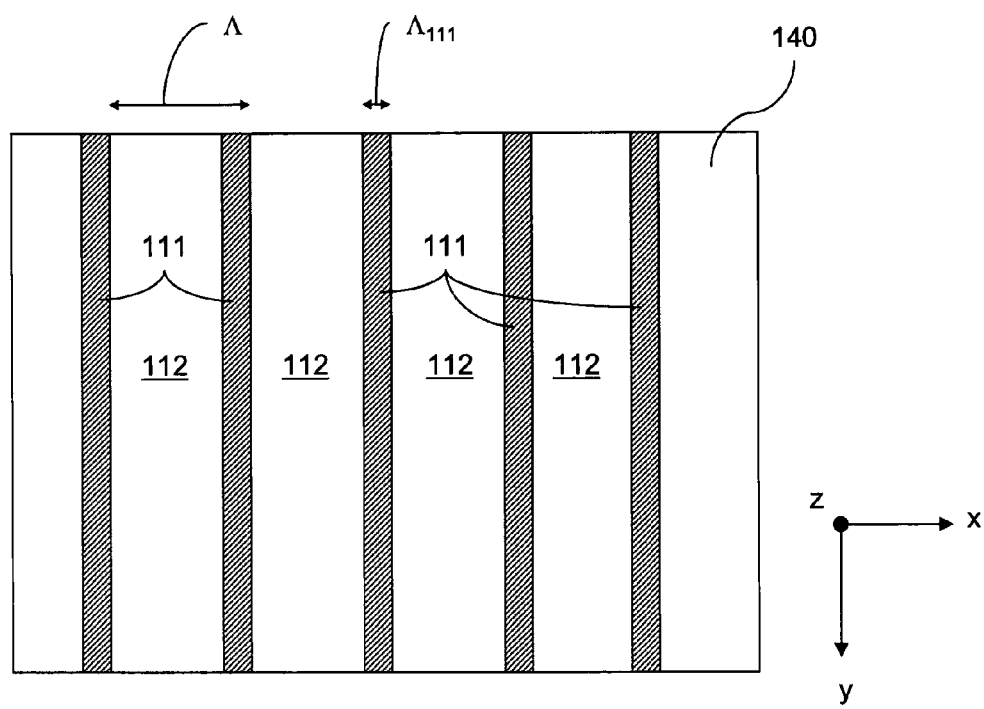
FIG. 1B is a plan view of an embodiment of a polarizer film.

Referring to FIGS. 1A and 1B, a linear polarizer film 100 includes a grating layer 110 and a substrate 140. Grating layer 110 includes grating lines 111 that extend along the y-direction of the Cartesian coordinate system shown in FIGS. 1A and 1B. Grating lines 111 are arranged to form a grating having a period Λ. The terms "pitch" and "period" are used interchangeably herein.

Grating layer 110 linearly polarizes incident light of wavelength $\lambda_1$ propagating parallel to the z-axis. In other words, for light of wavelength $\lambda_1$ incident on linear polarizer film 100 propagating parallel to the z-axis, linear polarizer film 100 substantially transmits the component of incident light plane-polarized in the x-direction (referred to as "pass" state polarization) and substantially blocks the component plane-polarized in the y-direction (referred to as "block" state polarization). For example, polarizer film 100 can transmit about 60% or more (e.g., about 70% or more, about 80% or more, about 90% or more, about 95% or more) of pass state light at $\lambda_1$ while passing about 5% or less of the block state light (e.g., about 4% or less, about 3% or less, about 2% or less, about 1% or less, about 0.5% or less, 0.3% or less, 0.2% or less, 0.1% or less) at $\lambda_1$. $\lambda_1$ can correspond to a local (or global) maximum in the pass state transmission spectrum. Alternatively, or additionally, $\lambda_1$ can correspond to a local (or global) minimum in the block state transmission spectrum.

In general, $\lambda_1$ is between about 100 nm and about 5,000 nm. In certain embodiments, $\lambda_1$ corresponds to a wavelength within the visible portion of the EM spectrum (e.g., from 400 nm to 700 nm). In some embodiments, $\lambda_1$ corresponds to a wavelength in the UV portion of the EM spectrum (e.g., from about 100 nm up to 400 nm), such as about 260 nm.

In some embodiments, linear polarizer film 100 polarizes radiation at more than one wavelength. For example, linear polarizer film 100 can polarize radiation at wavelengths $\lambda_1$ and $\lambda_2$, where $\lambda_1 < \lambda_2$ and $|\lambda_1 - \lambda_2|$ is about 50 nm or more (e.g., about 75 nm or more, about 100 nm or more, about 150 nm, about 200 nm or more, about 250 nm or more, about 300 nm or more, about 400 nm or more, about 500 nm or more). In certain embodiments, linear polarizer film 100 can polarize radiation for a continuous band of wavelengths, $\Delta\lambda$, that includes $\lambda_1$ and $\lambda_2$. For example, linear polarizer film 100 can polarize radiation for a band of wavelengths, $\Delta\lambda$, about 10 nm wide or more (e.g., about 20 nm wide or more, about 50 nm wide or more, about 80 nm wide or more, about 100 nm or more, about 200 nm or more, about 300 nm or more, about 400 nm or more). $\lambda_2$ can correspond to a local (or global) maximum in the pass state transmission spectrum. Alternatively, or additionally, $\lambda_2$ can correspond to a local (or global) minimum in the block state transmission spectrum.

Furthermore, while linear polarizer film 100 polarizes incident radiation propagating parallel to the z-axis, in some embodiments, polarizer film 100 can polarize radiation at $\lambda_1$ for radiation at non-normal angles of incidence (i.e., for radiation incident on linear polarizer film 100 propagating at an angle $\theta$ with respect to the z-axis, where $\theta$ is non-zero). In certain embodiments, linear polarizer film 100 can polarize radiation incident at more than one angle of incidence, such as for a range of incident angles. For example, in some embodiments, linear polarizer film 100 polarizes radiation incident within a cone of incident angles for $\theta$ of about 10° or more (e.g., about 15° or more, about 20° or more, about 30° or more, about 45° or more). Note that for non-normal incidence, the pass state corresponds to light polarized parallel to the x-z plane, while the block state corresponds to light polarized orthogonal to the x-z plane.

In embodiments, linear polarizer film 100 blocks a relatively large amount of incident radiation at $\lambda_1$ and/or $\lambda_2$ having the block state polarization by reflecting a relatively large amount of the block state radiation. For example, linear polarizer film 100 can reflect about 80% or more of incident radiation at $\lambda_1$ and/or $\lambda_2$ having the block polarization state (e.g., about 90% or more, about 95% or more, about 98% or more, about 99% or more).

Linear polarizer film 100 can have a relatively high extinction ratio, $E_T$, for transmitted light at $\lambda_1$ and/or $\lambda_2$. For transmitted light, the extinction ratio refers to the ratio of pass state intensity at $\lambda_1$ and/or $\lambda_2$ to the block state intensity transmitted by linear polarizer film 100. Extinction ratio is also referred to as polarizer contrast. $E_T$ can be, for example, about 10 or more at $\lambda_1$ and/or $\lambda_2$ (e.g., about 20 or more, about 30 or more, about 40 or more, about 50 or more, about 60 or more, about 70 or more, about 80 or more, about 90 or more, about 100 or more, about 150 or more, about 300 or more, about 500 or more). In some embodiments, $\lambda_1$ corresponds to a local (or global) maximum in the extinction ratio as a function of wavelength, $E_T(\lambda)$. Alternatively, or additionally, $\lambda_2$ can correspond to a local (or global) maximum in $E_T(\lambda)$.

The extinction ratio of a polarizer can also be expressed in decibels (dB) rather than as a ratio, where the relationship between the ratio $E_T$ and its corresponding dB value can be determined according to the equation:

$$E_{T,dB} = 10 \cdot \log_{10} E_T.$$

For example, an extinction ratio of 30 corresponds to approximately 15 dB, an extinction ratio of 50 corresponds to approximately 17 dB, and an extinction ratio of 100 corresponds to 20 dB.

Linear polarizer film 100 can exhibit good resistance to degradation, e.g., due to exposure to environmental or operational factors. Such factors include, for example, humidity, heat, exposure to an oxidant (e.g., air), and/or radiation. In general, good resistance to degradation means that the optical performance (e.g., pass state transmission, block state transmission, extinction ratio) of linear polarizer film varies relatively little with prolonged exposure to one or more of the environmental or operational factors. For example, in embodiments where linear polarizer film 100 is used as a polarizer for UV radiation, the polarizer film can exhibit little variation in optical performance over substantial periods (e.g., 100 hours or more, 500 hours or more, 1,000 hours or more) of exposure to the radiation. For example, the pass stage transmission and extinction ratio can vary by 10% or less (e.g., 5% or less, 2% or less, 1% or less) over substantial periods of exposure to the radiation.

One way to characterize a linear polarizer's resistance to environmental degradation is by controlled environmental testing, such as exposure to an elevated temperature in a controlled atmosphere. As an example, a linear polarizer can be exposed to an oxygen environment at a temperature of about 650° C. for 6 hrs. Linear polarizer films with good resistance to degradation exhibit a decrease in transmittance at $\lambda_1$ of about 8% or less (e.g., 5% or less, 4% or less, 3% or less, 2% or less, 1% or less) as measured before and after the exposure. In some embodiments, the transmittance at $\lambda_1$ can increase after the exposure. Linear polarizer films with good resistance to degradation can also exhibit a decrease in $E_T$ at $\lambda_1$ of about 8% or less (e.g., 5% or less, 4% or less, 3% or less, 2% or less, 1% or less) as measured before and after the exposure. In certain embodiments, $E_T$ at $\lambda_1$ can increase after the exposure.

As a further example, another way to test environmental stability is by prolonged exposure to a high power UV emission source for extended periods. Specifically, a linear polarizer film can be tested by positioning the polarizer 2 cm from a 1,000 W Mercury Arc Lamp (e.g., Model Code UVH 1022-0 available from Ushio America, Cypress, Calif.). The polarizer film is oriented so that light from the source is incident on the polarizer along z-axis. $E_T$ is measured at $\lambda_1$ before and after exposure. Embodiments of linear polarizer films with good resistance to degradation can also exhibit a decrease in $E_T$ at $\lambda_1$ of about 8% or less (e.g., 5% or less, 4% or less, 3% or less, 2% or less, 1% or less) as measured before and after the exposure. In certain embodiments, $E_T$ at $\lambda_1$ can increase after the exposure.

Turning now to the structure of grating layer 110, grating lines 111 extend along the y-direction, forming a periodic grating composed of grating lines separated by gaps 112. Grating lines 111 have a width $\Lambda_{111}$ in the x-direction, while the gaps 112 have a width $\Lambda_{112}$ in the x-direction. The grating period, $\Lambda$, equal to $\Lambda_{111} + \Lambda_{112}$, is smaller than $\lambda_1$ and as a result light of wavelength $\lambda_1$ interacts with grating layer 110 without encountering significant high-order, far-field diffraction that can occur when light interacts with periodic structures. Where $\lambda_1$ is in the visible or UV portion of the EM spectrum, grating layer 110 can be considered an example of a nanostructured layer.

In general, $\Lambda_{111}$ can be about 0.2 $\lambda_1$ or less (e.g., about 0.1 $\lambda_1$ or less, about 0.05 $\lambda_1$ or less, about 0.04 $\lambda_1$ or less, about 0.03 $\lambda_1$ or less, about 0.02 $\lambda_1$ or less, 0.01 $\lambda_1$ or less). For example, in some embodiments, $\Lambda_{111}$ is about 100 nm or less (e.g., about 75 nm or less, about 60 nm or less, about 50 nm or less, about 40 nm or less, about 30 nm or less, about 25 nm or less, about 20 nm or less, about 15 nm or less). In some embodiments, $\Lambda_{111}$ is about 10 nm or more (e.g., about 15 nm or more, about 20 nm or more). Similarly, $\Lambda_{112}$ can be about 0.2 $\lambda_1$ or less (e.g., about 0.1 $\lambda_1$ or less, about 0.05 $\lambda_1$ or less, about 0.04 $\lambda_1$ or less, about 0.03 $\lambda_1$ or less, about 0.02 $\lambda_1$ or less, 0.01 $\lambda_1$ or less). For example, in some embodiments, $\Lambda_{112}$ is about 200 nm or less (e.g., about 150 nm or less, about 100 nm or less, about 80 nm or less, about 70 nm or less, about 60 nm or less, about 50 nm or less, about 40 nm or less, about 30 nm or less). $\Lambda_{111}$ and $\Lambda_{112}$ can be the same as each other or different.

In general, $\Lambda$ is less than $\lambda_1$, such as about $0.5\,\lambda_1$ or less (e.g., about $0.3\,\lambda_1$ or less, about $0.2\,\lambda_1$ or less, about $0.1\,\lambda_1$ or less, about $0.08\,\lambda_1$ or less, about $0.05\,\lambda_1$ or less, about $0.04\,\lambda_1$ or less, about $0.03\,\lambda_1$ or less, about $0.02\,\lambda_1$ or less, $0.01\,\lambda_1$ or less). In some embodiments, A is about 500 nm or less (e.g., about 300 nm or less, about 200 nm or less, about 150 nm or less, about 130 nm or less, about 100 nm or less, about 80 nm or less, about 60 nm or less, about 50 nm or less, about 40 nm or less).

The duty cycle of grating layer, given by the ratio $\Lambda_{111}{:}\Lambda$, can vary as desired. In some embodiments, the duty cycle is less than about 50% (e.g., about 40% or less, about 30% or less, about 20% or less, about 10% or less, about 8% or less). Alternatively, in certain embodiments, the duty cycle is more than about 50% (e.g., about 60% or more, about 70% or more, about 80% or more).

In general, the number of grating lines 111 in a grating layer may vary as desired. The number of portions depends on the period, $\Lambda$, and the area required by the linear polarizer's end use application. In some embodiments, grating layer 110 can have about 50 or more portions (e.g., about 100 or more portions, about 500 or more portions, about 1,000 or more portions, about 5,000 or more portions, about 10,000 or more portions, about 50,000 or more portions, about 100,000 or more portions, about 500,000 more portions).

The thickness, d, of grating layer 110 measured along the z-axis can vary as desired. The terms "thickness" and "depth" are used interchangeably herein. In general, the thickness of layer 110 is selected based on the desired optical properties of grating layer 110 at $\lambda_1$ and constraints on the manufacturability of such structures. In some embodiments, d can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 or more, such as about 2,000 nm).

The aspect ratio of grating layer thickness, d, to $\Lambda_{111}$ and/or d to $\Lambda_{112}$ can be relatively high. For example d:$\Lambda_{111}$ and/or d:$\Lambda_{112}$ can be about 2:1 or more (e.g., about 3:1 or more, about 4:1 or more, about 5:1 or more, about 8:1 or more, about 10:1 or more, about 12:1 or more, about 15:1 or more, about 20:1 or more).

In general, the composition of grating lines 111 are selected so that polarizer film 100 has desired polarizing properties. The composition of grating lines 111 are also selected based factors such as their compatibility with the manufacturing processes used in production of polarizer film 100 and their environmental properties, such as resistance to degradation due to environmental exposure. In general, grating lines 111 are formed from a metal, such as aluminum, gold, silver, tungsten, tantalum, or copper.

The structure and composition of grating layer 110 is selected based on the desired optical performance of linear polarizer film 100. Structural parameters that affect the optical performance of linear polarize 100 include, for example, d, $\Lambda$, $\Lambda_{111}$, and $\Lambda_{112}$. Typically, varying a single parameter affects multiple different performance parameters. For example, the overall transmittance of the polarizer at $\lambda_1$ can be varied by changing the relative thickness of grating lines 111 formed from a non-transmissive material, $\Lambda_{111}$, to the thickness of gaps 112, $\Lambda_{112}$. However, while a lower ratio $\Lambda_{111}/\Lambda_{112}$ may provide relatively higher transmittance of the pass state polarization, it can also result in higher transmittance of the block state polarization, which decreases $E_T$. As a result, optimizing the polarizer's performance involves trade offs between different performance parameters and the polarizer's structure and composition is varied depending on the desired performance for the polarizer's end use application.

In general, to effectively polarize light at wavelength $\lambda_1$, the period $\Lambda$ of the grating layer should be shorter than $\lambda_1$, such as about $\lambda_1/4$ or less (e.g., about $\lambda_1/6$ or less, about $\lambda_1/10$ or less). Moreover, for effective broadband performance, $\Lambda$ should be shorter than the shortest wavelength in the wavelength band, $\Lambda\lambda$. For a broadband polarizer in the visible spectrum, for example, A should be less than about 300 nm, such as about 200 nm or less (e.g., about 150 nm or less, about 130 nm or less, about 110 nm or less, about 100 nm or less, about 90 nm or less, about 80 nm or less).

In some embodiments, $E_T$ can be increased by increasing the thickness of grating layer 110, d. Increasing d can provide increased $E_T$ without substantially reducing the amount of pass state transmittance.

Referring now to other layers in polarizer film 100, in general, substrate 140 provides mechanical support to polarizer film 100. In typical embodiments, where polarizer film 100 is a transmissive polarizer, substrate 140 is transparent to light at wavelength $\lambda_1$, transmitting substantially all light impinging thereon at wavelength $\lambda_1$ (e.g., about 90% or more, about 95% or more, about 97% or more, about 99% or more, about 99.5% or more).

In general, substrate 140 can be formed from any material compatible with the manufacturing processes used to produce polarizer 100 that can support the other layers. In certain embodiments, substrate 140 is formed from a glass, such as silica glass (e.g., fused quartz or fused silica, such as special UV grade fused silica), BK7 (available from Abrisa Corporation), borosilicate glass (e.g., pyrex available from Corning), and aluminosilicate glass (e.g., C1737 available from Corning). In some embodiments, substrate 140 can be formed from a crystalline material, such as crystalline quartz or calcium fluoride ($CaF_2$), or, in some cases, a non-linear optical crystal (e.g., $LiNbO_3$ or a magneto-optical rotator, such as garnet) or a crystalline (or semicrystalline) semiconductor (e.g., Si, InP, or GaAs). In certain embodiments, substrate 140 can include an organic material, such as an organic polymer (e.g., a plastic).

Figure 2:
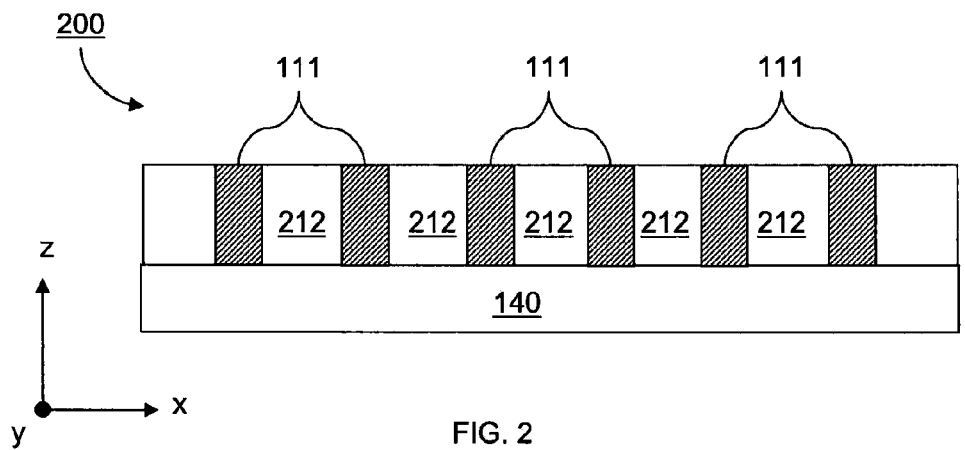
FIG. 2 is a cross-sectional view of an embodiment of a polarizer film.

While FIGS. 1A and 1B show a structure having a grating layer on a substrate, the grating layer being a free-standing grating composed grating lines 111 spaced apart by gaps, in general, polarizers can include additional portions and/or layers. For example, referring to FIG. 2, in some embodiments, a polarizer film 200 includes a material that fills gaps 112 in layer 110, providing a monolithic grating layer 210. In FIG. 2, these portions are designated as portions 212.

Generally, portions 212 are formed from a material that has a significantly higher transmissivity at $\lambda_1$ than the material forming grating lines 111. For example, the transmissivity of the material forming portions 212 can be about 100 times or more (e.g., about 500 times or more, about $10^3$ times or more, about $5\times10^3$ times or more, about $10^4$ times or more) higher than the transmissivity of the material forming grating lines 111. In some embodiments, portions 212 are formed from $SiO_2$ (e.g., quartz), which is an example of a material that has relatively high transmissivity at visible wavelengths.

In certain embodiments, both portions 212 and substrate 140 are formed from a glass, while grating lines 111 are formed from a metal.

Figure 3:
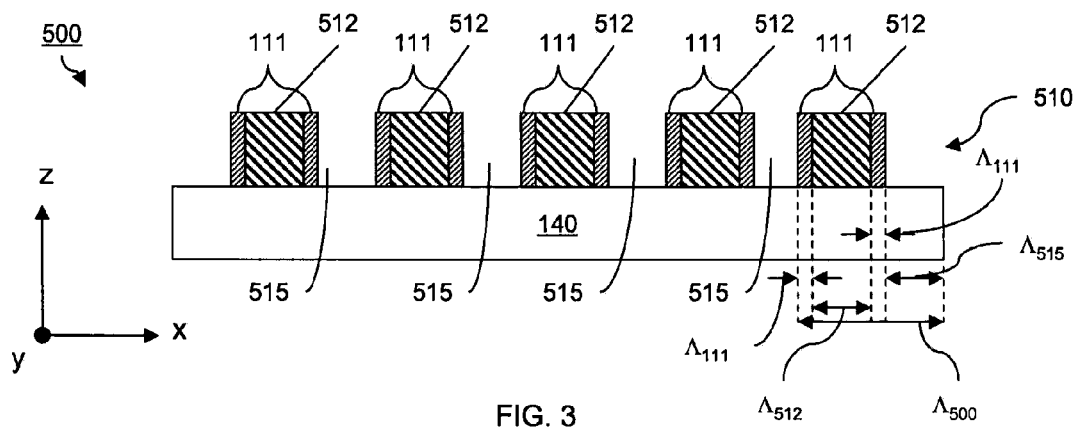
FIG. 3 is a cross-sectional view of an embodiment of a polarizer film.

While the grating layer in polarizer film 200 is a monolithic layer (i.e., there are no gaps between the different portions of the layer), embodiments can include some portions that are adjacent portions formed from different materials in addition to some portions that are adjacent to gaps. For example, referring to FIG. 3, a polarizer film 500 includes a grating layer 510 in which each grating line 111 is adjacent a portion 512 formed from a different material on one side, and adjacent a gap 515 on the opposite side.

In other words, grating lines 111 form side walls to portions 512. Portions 512 form a grating having a period $\Lambda_{500}$.

Portions 512 have a width $\Lambda_{512}$, while gaps 515 have a width $\Lambda_{515}$. In general, $\Lambda_{512}$ and $\Lambda_{515}$ are selected according to the desired optical properties of polarizer film 500. $\Lambda_{512}$ can be less than $\lambda_2$, such as about $\lambda_2/4$ or less (e.g., $\lambda_2/8$ or less, $\lambda_2/10$ or less, $\lambda_2/12$ or less). In other words, portions 512 form a subwavelength grating for radiation at $\lambda_2$. $\Lambda_{515}$ can be the same or different as $\Lambda_{512}$. Typically, larger values of $\Lambda_{515}$ correspond to higher transmission of incident radiation at $\lambda_1$ and $\lambda_2$.

In general, portions 512 are formed from a material that is different from the material forming grating lines 111. Portions 512 can be formed from a material that has relatively low transmission at $\lambda_2$. As an example, in some embodiments grating lines 111 are formed from a metal while portions 512 are formed from an oxide material (e.g., $SiO_2$, $TiO_2$).

In certain embodiments, portions of a material can replace gaps 515, providing a monolithic grating layer 510. For example, portions composed of a material having high transmissivity at $\lambda_1$ and $\lambda_2$ can be used to replace gaps 515. As an example, where $\lambda_1$ and $\lambda_2$ are in the UV or visible portions of the spectrum, portions composed of $SiO_2$ (e.g., quartz) can replace gaps 515.

Figure 4:
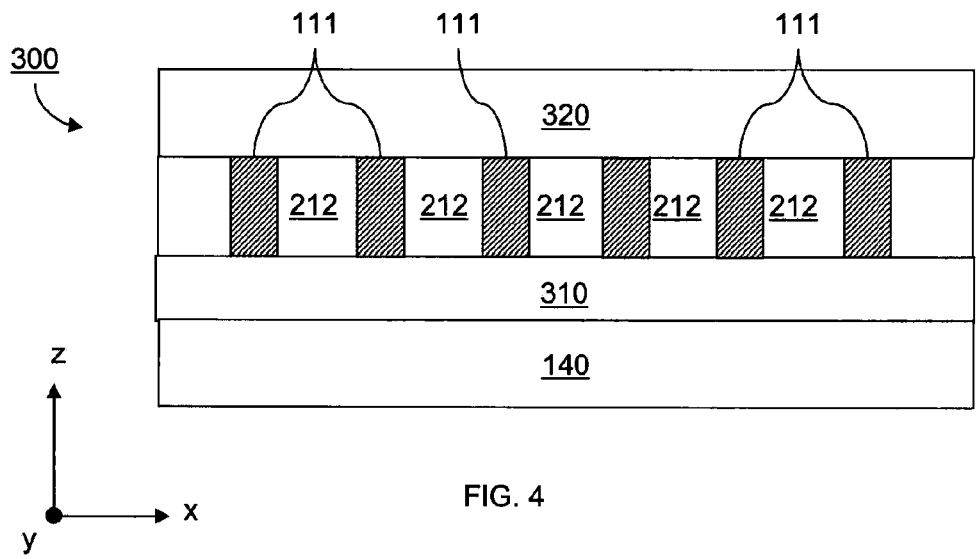
FIG. 4 is a cross-sectional view of an embodiment of a polarizer film.

Embodiments can include additional layers. For example, referring to FIG. 4, a polarizer film 300 includes an etch stop layer 310 and an antireflection film 320.

Etch stop layer 310 is formed from a material resistant to etching processes used to etch the material(s) from which portions 112 are formed. The material(s) forming etch stop layer 130 should also be compatible with substrate 140 and with the materials forming grating layer 110. Examples of materials that can form etch stop layer 130 include $HfO_2$, $SiO_2$, $Ta_2O_5$, $TiO_2$, $SiN_x$, or metals (e.g., Cr, Ti, Ni).

The thickness of etch stop layer 310 can be varied as desired. Typically, etch stop layer 310 is sufficiently thick to prevent significant etching of substrate 140, but should not be so thick as to adversely impact the optical performance of polarizer film 100. In some embodiments, etch stop layer is about 500 nm or less (e.g., about 250 nm or less, about 100 nm or less, about 75 nm or less, about 50 nm or less, about 40 nm or less, about 30 nm or less, about 20 nm or less).

Antireflection film 320 can reduce the reflectance of pass state light of wavelength $\lambda_1$ impinging on and/or exiting polarizer film 100. Antireflection film 320 generally includes one or more layers of different refractive index. As an example, antireflection film 320 can be formed from four alternating high and low index layers. The high index layers can be formed from $TiO_2$ or $Ta_2O_5$ and the low index layers can be formed from $SiO_2$ or $MgF_2$. The antireflection films can be broadband antireflection films or narrowband antireflection films.

In some embodiments, polarizer films have a reflectance of about 5% or less of light impinging thereon at wavelength $\lambda$ for pass state polarization (e.g., about 3% or less, about 2% or less, about 1% or less, about 0.5% or less, about 0.2% or less).

Generally, polarizer films are prepared using deposition and patterning techniques commonly used in the fabrication of integrated circuits. Deposition techniques that can be used include sputtering (e.g., radio frequency sputtering), evaporating (e.g., electron beam evaporation, ion assisted deposition (IAD) electron beam evaporation), or chemical vapor deposition (CVD) such as plasma enhanced CVD (PECVD) or low pressure CVD (LPCVD), atomic layer deposition (ALD) (e.g., plasma enhanced ALD), or by oxidization. Patterning can be performed using lithographic and etching techniques, such as electron beam lithography, photolithography (e.g., using a photomask or using holographic techniques), and imprint lithography. Etching techniques include, for example, reactive ion etching, ion beam etching, sputtering etching, chemical assisted ion beam etching (CAIBE), or wet etching.

A discussion of techniques for forming grating structures that can be applied to the structures described herein are discussed in U.S. Patent Publication No. US 2005-0277063 A1, entitled "OPTICAL FILMS AND METHODS OF MAKING THE SAME," filed on May 27, 2005, the entire contents of which is incorporated herein by reference. In some embodiments, multiple polarizers can be prepared simultaneously by forming a relatively large grating layer on a single substrate, which is then diced into individual units. For example, a grating layer can be formed on a substrate that has a single-side surface area about 10 square inches or more (e.g., a four inch, six inch, or eight inch diameter substrate). After forming the grating layer, the substrate can be diced into multiple units of smaller size (e.g., having a single-side surface area of about one square inch or less).

Figure 5A:
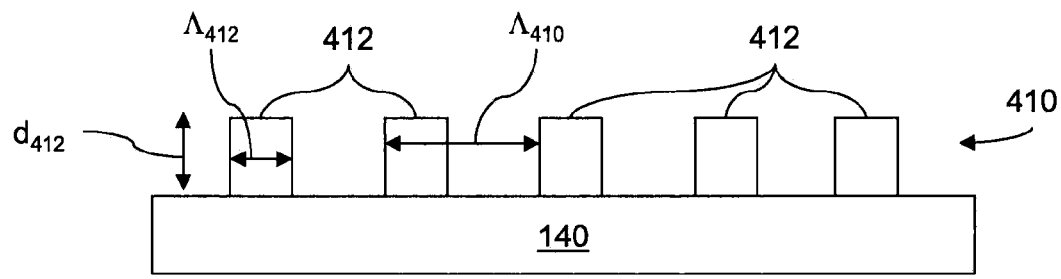
FIG. 5A-5C are cross-sectional views of structures in various stages in the fabrication of an embodiment of a polarizer film.
Figure 5B:
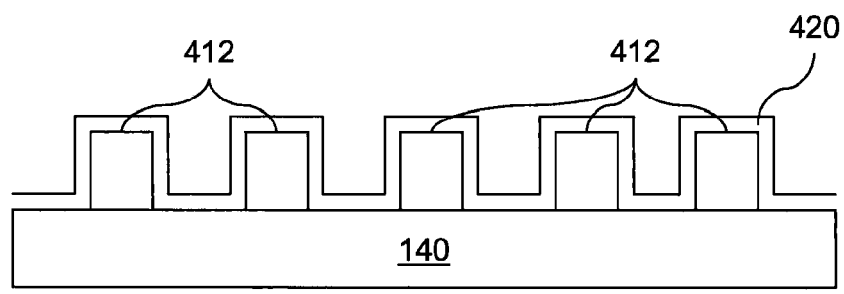
Figure 5C:
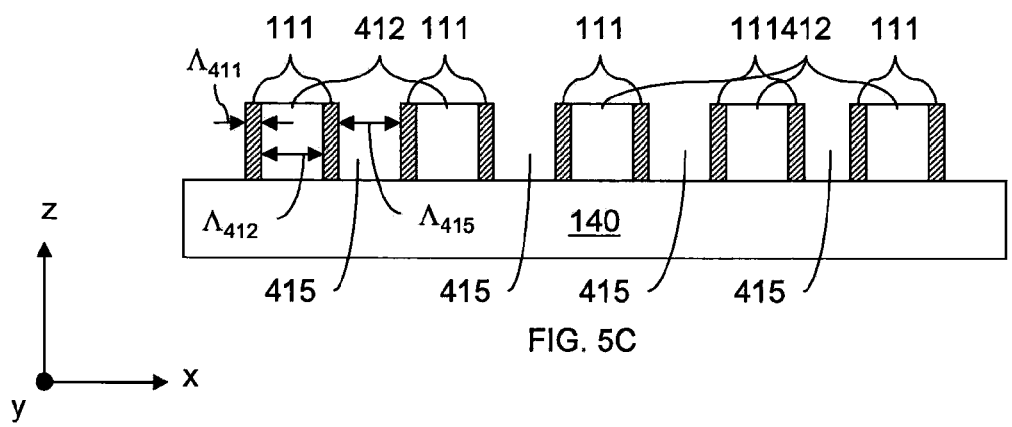

Referring now to FIGS. 5A-5C, in some embodiments, a grating layer with a short period is formed by depositing a material onto the side walls of portions of a primary grating having a relatively longer period. FIG. 5A shows a cross-sectional view of the primary grating layer 410, composed of spaced apart grating lines 412 supported by substrate 140. Grating layer 410 has a period $\Lambda_{410}$. Grating lines 412 have a width $\Lambda_{412}$ and a thickness $d_{412}$. Grating lines 412 are formed from a material that has a significantly higher transmissivity at $\lambda_1$ than the material forming grating lines 111. In some embodiments, grating lines 412 are formed from silica or quartz.

In certain embodiments, grating lines 412 are formed from the same material as substrate 140. For example, grating layer 410 can be formed by etching portions of a monolithic layer of the substrate material.

Referring to FIG. 5B, a conformal layer 420 having a substantially uniform thickness is deposited onto the primary grating layer. In certain embodiments, conformal layer 420 is deposited using atomic layer deposition ("ALD") (e.g., plasma enhanced ALD ("PEALD")) or low pressure chemical vapor deposition ("LPCVD"). PEALD and LPCVD are described in more detail below. In general, the thickness of conformal layer 420 depends on the desired thickness, $\Lambda_{111}$, of grating lines 111.

Referring to FIG. 5C, to form grating lines 111, conformal layer 420 is anistroptrically etched, leaving substantially only the portions of conformal layer 420 on the sidewalls of portions 412. These remaining portions are grating lines 111 of the polarizer film. Here, grating lines 111 on opposing sides of the same portion 412 are separated by a distance $\Lambda_{412}$, while grating lines 111 of facing sides of adjacent portions 412 are separated by gaps 415 that have a width $\Lambda_{415}$, which can be the same or different as $\Lambda_{412}$. In embodiments where $\Lambda_{412}$ is different from $\Lambda_{415}$, the period of the grating formed from grating lines 111, $\Lambda$, is considered to be the average of $\Lambda_{111}+\Lambda_{412}$ and $\Lambda_{111}+\Lambda_{415}$. The thickness of this grating is the same as $d_{415}$.

Optionally, portions 412 can be selectively etched away leaving free standing grating lines 111 (i.e., grating lines that are unsupported on their side walls).

In a typical CVD process, a substrate is exposed to one or more volatile precursors, which react and/or decompose on the substrate surface to produce a desired deposit. LPCVD is a CVD process that is performed at sub-atmospheric pressures. Reduced pressure can reduce unwanted gas-phase reactions and improve film uniformity across the wafer relative to CVD processes performed at higher pressures. A carrier gas can be used to transport the precursor to the substrate.

A variety of metals can be conformally deposited using LPCVD, including, for example aluminum, tungsten, copper or silver.

A variety of precursors can be used, depending on the desired deposit. For example, aluminum can be deposited from tri-isobutyl aluminium (TIBAL), Tri-methyl Aluminum (TMA), $(CH_3)_2AlH$ (DMAH), or Tri-ethyl Aluminum (TEA). Aluminum precursors can be decomposed, for example, at temperatures of 200-300° C. and pressures up to 1 atm.

Molybdenum can be deposited from $MoF_6$ at temperatures of about 200-500° C., from $Mo(CO)_6$ at temperatures of about 200-600° C., and from $MoCl_5$ at temperatures of about 500-1100° C., for example.

Tantalum can be deposited, for example, from $TaCl_5$ at temperatures of about 600° C. or more, from $Ta(CO)_5$ at temperatures of about 450-600° C., and from $TaF_5$ at temperatures of about 250-400° C.

Titanium can be deposited from its pentachloride or from tris-(2.2°bipyridine) titanium at temperatures of about 600° C. or more, for example.

Nickel can be reduced (e.g., using hydrogen) from nickel alkyl, $Ni(C_5H_5)_2$ at about 200° C., for example, or from nickel chelate, $Ni(C_5HF_6O_2)_2$ at about 250° C.

Tungsten can be reduced (e.g., using hydrogen or $SiH_4$) from $WF_6$ at temperatures of about 750° C. or more, from $WCl_6$ at temperatures of about 600° C., from $WBr_6$ at temperatures of about 600° C., from $W(CO)_6$ at temperatures of about 230° C., and from $W(C_6H_6)_2$ at temperatures of about 60-160° C.

An example of LPCVD of aluminum is as follows. First, substrate wafers are placed in a reactor which is evacuated and purged with hydrogen at, e.g., 450° C. (e.g., to reduce adsorbed air and moisture in the chamber). Next, the reactor temperature can be reduced and the substrates activated by introducing $TiCl_4$ vapor at a low pressure (e.g., about 0.5 torr). Following the pumpdown, an aluminum precursor is evaporated into the reaction chamber. For example, TIBAL liquid (for aluminum deposition) can be evaporated at 45° C. and flowed through the reactor (e.g., maintained at about 260° C. and about 0.5 torr) until sufficient aluminum is deposited on the substrate surface.

In general, other carrier gases and precursors can be used. The table below lists several possible precursors with corresponding carrier gas (where appropriate). The table also lists vapor pressure of the precursor in the fourth column, with precursor temperature in parenthesis. The "Growth Temp" refers to the temperature in the deposition chamber itself.

Moreover, generally, higher or lower pressures than 0.5 torr can be used. For LPCVD, the pressure in the chamber is less than 50 torr. However, pressures as low as about $1 \times 10^{-7}$ torr can be used. Generally, lower pressures result in better film uniformity, step coverage, and film quality but can involve higher temperature deposition and reduced deposition rates.

Examples of aluminum deposition using LPCVD is described, for example, by R. A. Levy, M. L. Green, and P. K. Gallagher in their article entitled "Characterization of LPCVD Aluminum for VLSI Processing," *J. Electrochem. Soc.*: SOLID-STATE SCIENCE AND TECHNOLOGY, pp. 2175-2182 (September 1984), the entire contents of which is incorporated herein by reference.

Precursor delivery methods can have significant effects on deposition according to physical properties of the precursor. In embodiments where the precursor is a gas at room temperature, it can be delivered with mass-flow controllers. However, the precursors to metals are often liquids or solids and have low vapor pressures. For these precursors, delivery methods may include bubblers and direct vaporization, liquid delivery and aerosol delivery.

ALD is a self-limiting, sequential surface chemistry that can be used to deposit conformal thin-films of materials onto substrates. ALD can be similar in chemistry to chemical vapor deposition (CVD), except that the ALD reaction breaks the CVD reaction into two half-reactions, keeping the precursor materials separate during the reaction. ALD film growth is self-limited and based on surface reactions, which makes achieving atomic scale deposition control possible. By keeping the precursors separate throughout the coating process, atomic layer control of film grown can be obtained as fine as ~0.1 angstroms per monolayer. ALD methods are described in U.S. Ser. No. 12/191,965 entitled "POLARIZER FILMS AND METHODS OF MAKING THE SAME," filed on Aug. 14, 2008, and published as U.S. 2009/0041971, and in U.S. Ser. No. 12/053,058, entitled "METHODS FOR FORMING PATTERNED STRUCTURES," filed on Mar. 21, 2008, and published as U.S. 2009/0053655, the entire contents both of which are incorporated herein by reference.

Methods for depositing aluminum using ALD can be found, for example, in the reference authored by Jong Tae Kim, entitled "Method for forming aluminum layer by atomic layer deposition," in *Repub. Korean Kongkae Taeho Kongbo* (2003). Methods are also described by Yong Ju Lee and coworkers in "Study on the characteristics of aluminum thin films prepared by atomic layer deposition," published in the *Journal of Vacuum Science & Technology, A: Vacuum, Surfaces, and Films* (2002), 20(6), pp. 1983-1988. Further methods are described by Yong Ju Lee and Sang-Won Kang in "Atomic layer deposition of aluminum thin films using an alternating supply of trimethylaluminum and a hydrogen plasma," published in *Electrochemical and Solid-State Let-*

| Precursor | Abbr. | Carrier gas | Vapor pressure (torr) (temp(° C.)) | Growth Temp Lowest temp(° C.) |
|---|---|---|---|---|
| Trimethylaluminum | TMA | H2 | 11 (20) | 300 |
| Triethylaluminum | TEA | N2 | 0.1 (36) | 160 |
| Triisobutylaluminum | TIBA | H2/N2/Ar | 0.1 (27) | 250 |
| Dimethylaluminum hydride | DMAH | H2 | 2 (25) | 240 |
| Diethylaluminum chloride | DEACl | \ | 3 (60) | 340 |
| Trimethylamine alane | TMAA | \ | 1.1 (19) | 100 |
| Triethylamine alane | TEAA | \ | 0.5 (25) | 100 | ters (2002), 5(10), pp. C91-C93. The entire contents of these three references are incorporated herein in their entirety.

PEALD uses a plasma to accelerate the deposition reaction during ALD. PEALD differs from conventional ALD in its use of a plasma—conventional ALD uses thermal dissociation. In PEALD, plasma dissociates a precursor gas to produce desired radicals and/or ions which are reactive and react with a pre-adsorbed metal precursor on the substrate surface to form a monolayer of the metal. The reaction can occur at relatively low temperatures Plasmas can be generated in a variety of ways. For example, in some embodiment, suitable plasmas are generated by applying an electric field to a gas. Alternating current fields at a variety of frequencies can be used. For example, radio frequency or microwave frequency fields can be used. Exemplary frequencies that can be used are 13.56 MHz or 2.45 GHz.

The plasma can create the active species and ions in large quantities inside the plasma discharge. Typically, radicals are present outside of the plasma discharge but recombine quickly.

In general, PEALD can use remote or direct plasma. Direct plasma is generally contained inside the reaction chamber with all species participating in the deposition being in the plasma environment. Remote plasma generally excites chosen precursors upstream of reaction chamber so that the only radicals flow to the substrate. In other words, for remote plasma, the substrate not directly exposed to the plasma.

As an example, aluminum can be deposited using a TMA precursor that is dissociated using an $H_2$ plasma at about 250° C. This deposition involves a two-step cycle involving an initial pulse of TMA, followed by a purge by letting the vacuum remove non-adsorbed material, then a pulse of the hydrogen, followed by another vacuum purge. This cycle is repeated until the desired about of aluminum is deposited. In general, the reaction conditions can be optimized as necessary, but in some embodiments a total pressure of 133 Pa and a TMA partial pressure of 12.09 and 66.5 Pa can be used. The aluminum growth rate in such implementations can be about 0.15 nm/cycle.

In general, a variety of different precursors can be used to form metal layers using ALD. For example, TMA can be used for aluminum deposition, TiCl4 for titanium deposition, iron bis(N,N\'-di-tert-butylacetamidinate) (Fe(tBuAMD)$_2$) for iron deposition, Nickel(II) acetylacetonate (Ni(acac)$_2$) for nickel deposition, CuCl and Copper(II) acetylacetonate (Cu(acac)$_2$) copper deposition, GeCl$_4$ for germanium deposition, MoCl$_5$ for molybdenum deposition, Pd(2,2,6,6-tetramethyl-3,5-heptanedione) (Pd(thd)$_2$) for Palladium deposition, TaCl$_5$ for tantalum deposition, WF$_6$ for tungsten deposition, and Pt(acac)$_2$ for platinum deposition.

The chamber pressure during each phase of an ALD process can vary as desired and is generally selected to provide desired monolayer composition and thickness. In some embodiments, the chamber pressure during exposure to the precursor or reagent is in a range from 0.1 torr to about 10 torr. In certain embodiments, the chamber pressure during exposure to a precursor or reagent is sufficiently high to provide continuous monolayer coverage of the exposed substrate surface. For example, the chamber pressure can be about $1 \times 10^{-5}$ torr or more. Typically, the chamber pressure is about 50 torr or less during exposure to the precursor or reagent. Generally, the pressure is kept sufficiently low to avoid possible self decomposition of the precursor and contamination of the deposited material.

In general, the chamber is purged between deposition cycles. Typically, the chamber is purged under vacuum although, in some embodiments, the chamber can be purged using a purge gas. The purge gas is a gas that is non-reactive with the exposed substrate surface and flushes the chamber of residual precursor and/or reagent.

The following table lists various combinations of precursor and reagent for forming metal layers.

| Precursor | Reagent | Metal |
|---|---|---|
| TMA | Hydrogen | Aluminum |
| TiCl$_4$ | Hydrogen | Titanium |
| Fe(tBuAMD)$_2$ | Water | Iron |
| Ni(acac)$_2$ | Hydrogen | Nickel |
| CuCl or Cu(acac)$_2$ | Hydrogen | Copper |
| GeCl$_4$ | Hydrogen | Germanium |
| MoCl$_5$ | Zinc | Molybdenum |
| Pd(thd)$_2$ | Hydrogen | Palladium |
| TaCl$_5$ | Hydrogen | Tantalum |
| WF$_6$ | Si$_2$H$_6$ | Tungsten |
| Pt(acac)$_2$ | Hydrogen | Platinum |

Figure 6:
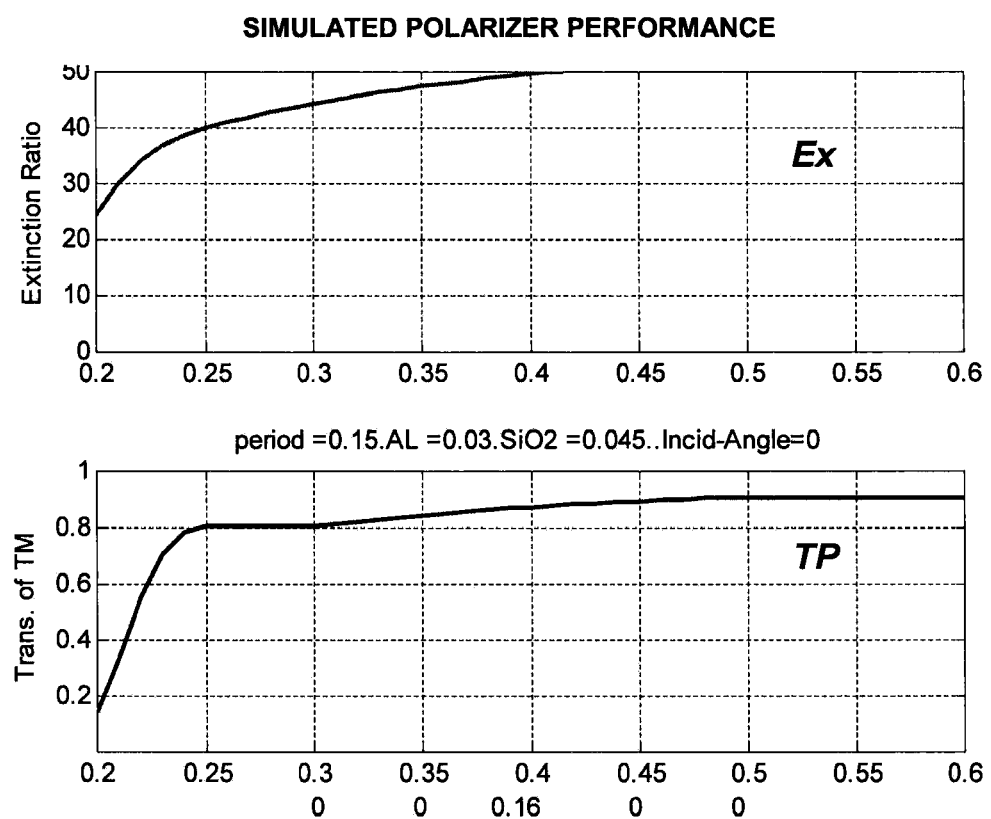
FIG. 6 are plots showing modeled optical performance as a function of wavelength for an embodiment of a polarizer film.

Turning now to the theoretical performance of some exemplary structures, FIG. 6 shows plots of pass state transmittance (lower plot) and extinction ratio (upper plot, in dB) as a function of wavelength (horizontal axis, units are µm) for a polarizer film having a structure that is the same as is shown in FIG. 5C, where portions 412 are composed of SiO$_2$ with $\Lambda_{412}$=45 nm. Grating lines 111 are formed of Al, with $\Lambda_{411}$=30 nm. $\Lambda_{415}$=45 nm and the grating depth is 160 nm. As can be seen in FIG. 6, the grating has an extinction ratio that exceeds 40 dB for wavelengths of about 250 nm or more. Transmittance of the pass state is about 80% or more for the same wavelength range.

The data in FIG. 6 was generated using the MATLAB grating diffraction calculator GD-Calc® obtained from KJ Innovation (http://software.kjinnovation.com/GD-Calc.html). Refractive index data for all the materials in such simulations can be taken from experimental data, data reported in journal articles, and/or data referenced reference texts, such as the "Handbook of Optical Constants of Solids" (5 Volume Set) (Hardcover) by Edward D. Palik (Editor), Academic Press.

While certain embodiments have been described, in general, other linear polarizer structures are also possible. For example, while FIGS. 1A, 1B, 2, 3A-3D, and 4 show a variety of configurations of polarizer films, other embodiments can include additional or fewer layers. For example, in some embodiments, polarizers can include additional antireflection films (e.g., between substrate layer 140 and etch stop layer 310 in polarizer film 300). Embodiments can also include protective layers, such as hardcoat layers (e.g., hardcoat polymers).

Although embodiments of polarizers have been described that include a grating layer that has a rectangular grating profile, other embodiments are also possible. For example, in some embodiments, the grating layer have a curved profile, such as a sinusoidal profile. Alternatively, the grating layer can have a triangular profile, sawtooth profile, or trapezoidal profile. Moreover, in general, the profile of grating layers may vary slightly from its designated geometry (e.g., rectangular, triangular, trapezoidal) due to imperfections associated with the manufacturing process.

Furthermore, while the grating period in the grating layers of polarizers has been described as constant, in certain embodiments the grating period may vary. In some embodiments, portions of grating layers can be arranged non-periodically.

Polarizer films such as those described herein can be incorporated into optical devices, including passive optical devices (e.g., polarizing devices) and active optical devices (e.g., liquid crystal displays). Polarizer films can be integrated into the device, providing a monolithic device, or can be arranged separately from other components of the device.

Figure 7:
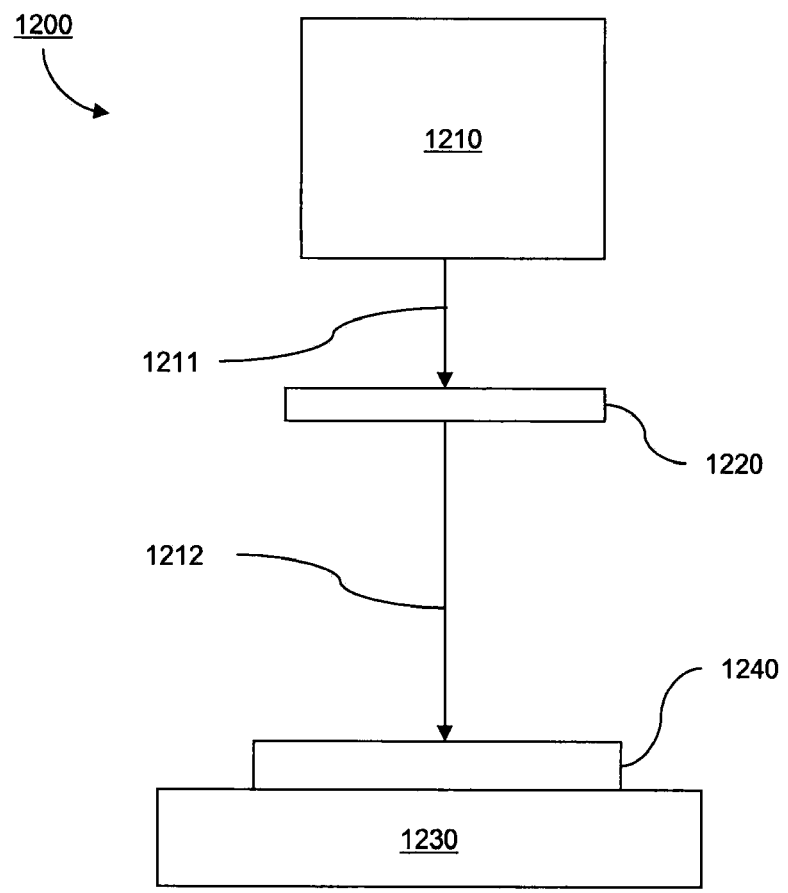
FIG. 7 is a schematic diagram of an exposure system.

In certain embodiments, polarizer films can be used in applications to provide polarized UV radiation to a substrate. Referring to FIG. 7, a UV exposure system 1200 includes a UV source 1210, a polarizer film 1220, and a substrate support 1230 configured to position a substrate 1240 to receive radiation from UV source 1210. Radiation 1211 emitted from source 1210 passes through polarizer film 1220, emerging as polarized radiation 1212 directed to substrate 1240. Optionally, system 1200 can include optical elements between source 1210 and polarizer film 1220 and/or between polarizer film 1220 and substrate 1240. The optical elements can be used to control (e.g., homogenize) the illumination of the substrate by source 1210. As an example, in some embodiments, UV exposure system 1200 can be used to expose liquid crystal alignment layers, e.g., on a surface of an LCD panel.

As another example, polarizer films can be used in lithography exposure tools that utilize UV radiation to expose resist layers on wafers or LCD substrates.

UV polarizers can also be used in the metrology system for wafer inspection (e.g., such as in commercially-available metrology systems like the Surfscan systems available from KLA-Tencor, San Jose, Calif.), where narrowband UV light (e.g., at about 266 nm) and/or broadband UV light (e.g., from about 240 nm to about 450 nm) is used to illuminate wafers and detect light reflected from the wafers. Information about the wafers can be determined based on the reflected light. UV polarizers can be used to polarize the incident illumination and/or analyze the reflected illumination, thereby providing polarization-dependent information about the wafer and/or enhancing the resolution of the system relative to systems that utilize unpolarized light.

A number of embodiments have been described. Other embodiments are in the following claims.

What is claimed is:

1. A method, comprising:
    providing a first grating including a plurality of grating lines formed from a dielectric material, each grating having a pair of sidewalls, facing sidewalls of adjacent grating lines being separated by corresponding trenches, the grating lines and trenches forming a grating surface;
    forming a layer of a metal on the grating surface, where the metal layer has a constant thickness and conforms to the grating surface;
    and removing portions of the metal layer between sidewalls of adjacent grating lines of the first grating to form a metal grating having grating lines formed from the metal, the grating lines of the metal grating corresponding to the portions of the metal layer adjacent the sidewalls of the grating lines of the first grating, wherein the metal grating has a pitch of 200 nm or less, a depth of 50 nm or more, and the grating lines of the metal grating have an aspect ratio of 10-to-1 or more.

2. The method of claim 1, wherein the metal layer is formed using atomic layer deposition.

3. The method of claim 2, wherein the using atomic layer deposition comprises sequentially forming a plurality of intermediate layers of the metal on the grating surface, each of the intermediate layers conforming to the grating lines.

4. The method of claim 3, wherein forming each of the intermediate layers comprises introducing a reagent into a chamber housing the first grating and forming a plasma from the reagent.

5. The method of claim 1, wherein the metal layer is formed using chemical vapor deposition.

6. The method of claim 5, wherein the chemical vapor deposition is performed at a pressure less than 1 torr.

7. The method of claim 1, wherein providing the first grating comprises forming a layer of the dielectric material on a substrate and removing portions of the layer to form the first grating.

8. The method of claim 1, wherein providing the first grating comprises removing portions of a substrate composed of the dielectric material to provide the first grating.

9. The method of claim 1, wherein the dielectric material is an inorganic dielectric material.

10. The method of claim 1, wherein the metal is aluminum, tungsten, copper, gold, or silver.

11. The method of claim 1, wherein the portions of the metal layer are removed by etching of the metal layer.

12. The method of claim 11, wherein etching is reactive ion etching.

13. The method of claim 1, wherein the metal grating has a pitch of 100 nm or less.

14. The method of claim 1, wherein the grating lines of the metal grating have an aspect ratio of 15-to-1 or more.

15. The method of claim 1, wherein the metal grating has a depth in a range from 100 nm to 500 nm.

16. The method of claim 1, wherein the grating lines of the metal grating have a line width in a range from 5 nm to 40 nm.

17. The method of claim 1, wherein the grating lines of the metal grating have a line width of 15 nm or less.

18. The method of claim 1, further comprising forming layers of one or more additional materials over the metal grating lines.

19. A method, comprising:
    providing a first grating including a plurality of grating lines formed from a dielectric material, each grating having a pair of sidewalls, facing sidewalls of adjacent grating lines being separated by corresponding trenches, the grating lines and trenches forming a grating surface;
    forming a layer of a metal on the grating surface, where the metal layer has a constant thickness and conforms to the grating surface;
    and removing portions of the metal layer between sidewalls of adjacent grating lines to form a metal grating having grating lines formed from the metal, the grating lines of the metal grating corresponding to the portions of the metal layer adjacent the sidewalls of the grating lines of the first grating layer, wherein the metal grating has a pitch of 200 nm or less, a depth of 50 nm or more, and the grating lines of the metal grating have a line width of 30 nm or less.

20. A method, comprising:
    providing a first grating including a plurality of grating lines formed from a dielectric material, each grating having a pair of sidewalls, facing sidewalls of adjacent grating lines being separated by corresponding trenches, the grating lines and trenches forming a grating surface;
    forming a layer of a metal on the grating surface using atomic layer deposition, where the metal layer has a constant thickness and conforms to the grating surface;
    and removing portions of the metal layer between sidewalls of adjacent grating lines to form a metal grating having grating lines formed from the metal, the grating lines of the metal grating corresponding to the portions of the metal layer adjacent the sidewalls of the grating lines of the first grating layer, wherein the second grating has a pitch of 200 nm or less and a depth of 50 nm or more.

* * * * *